United States Patent [19]
Kalthoff

[11] Patent Number: 6,026,382
[45] Date of Patent: Feb. 15, 2000

[54] COMPUTER-IMPLEMENTED SYSTEM FOR RELATIONSHIP MANAGEMENT FOR FINANCIAL INSTITUTIONS

[75] Inventor: Nancy Yvonne Kalthoff, Rancho Palos Verdes, Calif.

[73] Assignee: NCR Corporation, Dayton, Ohio

[21] Appl. No.: 08/947,137

[22] Filed: Oct. 8, 1997

[51] Int. Cl.[7] .................................................. G06F 17/60
[52] U.S. Cl. ............................................................ 705/35
[58] Field of Search ........................... 705/35, 1; 707/2, 707/103

[56] References Cited

U.S. PATENT DOCUMENTS

| | | | |
|---|---|---|---|
| 5,617,567 | 4/1997 | Doktor | 707/2 |
| 5,655,085 | 8/1997 | Ryan et al. | 705/14 |
| 5,659,723 | 8/1997 | Dimitrios et al. | 707/103 |
| 5,712,987 | 1/1998 | Waits et al. | 705/10 |
| 5,721,831 | 2/1998 | Waits et al. | 705/35 |

OTHER PUBLICATIONS

"New target marketing strategy: AT&T–GIS want the smart banks." Bank Automation News, vol. 6, No. 11, Jun. 15, 1994.

Feibus, Andy. "The real TPC benchmark story." Open Systems Today. May 25, 1992.

Burns, Darnell H. and Edward R. Ross. "Developing data bases (customer information files of banks)." Bank Management, vol. 67, No. 12, p. 49, Dec., 1991.

Hellauer, Brian. "Relational data base technology reveals fresh potential." Computers in Banking, vol. 7, No. 8, p. 22, Aug., 1990.

*Primary Examiner*—Allen R. MacDonald
*Assistant Examiner*—Michele Stuckey Crecca
*Attorney, Agent, or Firm*—Gates & Cooper

[57] ABSTRACT

An apparatus, method, and article of manufacture for implementing a financial system. The financial system comprises a computer for storing a database describing operations of a financial institution. The database comprises: (1) party data that identifies any individual or external organization, (2) product data that identifies any marketable product or service offered by the financial institution, (3) account data that identifies an ongoing arrangement between the financial institution and the party data, (4) internal organization data that identifies a unit of the financial institution, (5) contact/transaction event data that identifies any occurrence of an event that involves the account data or party data, (6) location data that identifies an address for the party data, (7) campaign data that identifies a marketing strategy or promotional event for the financial institution, and (8) channel data that identifies any vehicle by which any individual or external organization interacts with the financial institution. A database management system, performed by the computer, accesses the database stored in the computer via relationships between the party data, product data, account data, internal organization data, contact/transaction event data, location data, campaign data, and channel data.

17 Claims, 2 Drawing Sheets

COMPUTER-IMPLEMENTED SYSTEM FOR RELATIONSHIP MANAGEMENT FOR FINANCIAL INSTITUTIONS

BACKGROUND OF THE INVENTION

1. Field of the Invention

The present invention generally relates to a computer-implemented financial system, and more specifically, to a computer-implemented system that provides for relationship management for financial institutions.

2. Description of Related Art

Traditional computer-implemented banking systems model data using three major concepts: Customer—Account—Transaction (C-A-T). In the C-A-T model, Customers are related to Accounts and Accounts are related to Transactions. This model is helpful for the limited purpose of verifying and evaluating customer transactions.

However, the model fails to address business questions related to the areas of profitability, risk, sales/marketing, and channel management. Thus, there is a need in the art for a computer-implemented banking system that models data in a manner that encompasses a wide range of business questions.

SUMMARY OF THE INVENTION

To overcome the limitations in the prior art described above, the present invention discloses an apparatus, method, and article of manufacture for implementing a financial system on a computer, wherein the computer stores a database describing operations of a financial institution. The database comprises: (1) party data that identifies any individual or external organization, (2) product data that identifies any marketable product or service offered by the financial institution, (3) account data that identifies an ongoing arrangement between the financial institution and the party data, (4) internal organization data that identifies a unit of the financial institution, (5) contact/transaction event data that identifies any occurrence of an event that involves the account data or party data, (6) location data that identifies an address for the party data, (7) campaign data that identifies a marketing strategy or promotional event for the financial institution, and (8) channel data that identifies any vehicle by which any individual or external organization interacts with the financial institution. A database management system, performed by the computer, accesses the database stored in the computer via relationships between the party data, product data, account data, internal organization data, contact/transaction event data, location data, campaign data, and channel data.

BRIEF DESCRIPTION OF THE DRAWINGS

Referring now to the drawings in which like reference numbers represent corresponding parts throughout.

DETAILED DESCRIPTION OF THE INVENTION

In the following description, reference is made to the accompanying drawings which form a part hereof, and in which is shown by way of illustration specific embodiments in which the invention may be practiced. It is to be understood that other embodiments may be utilized and structural changes may be made without departing from the scope of the present invention.

Overview

The present invention provides a computer-implemented system that provides for relationship management for financial institutions using a logical data model. To include a wide range of circumstances, the present invention redefines and expands upon the traditional C-A-T model for computer-implemented financial systems. The following paragraphs describe the major subject areas in the present invention and show how the C-A-T model has been expanded to accomplish the objectives of the present invention.

In computer-implemented financial systems, stored data naturally congregates around major categories of data called subject areas. A subject area is a subset of a logical data model that comprises similar data concepts that are independent of any application that will use it. The subject areas in the logical data model used by the computer-implemented financial system of the present invention include, but are not limited to, Party, Product, Account, Internal Organization, Event, Location, Campaign, and Channel. These are the major things that a financial institution is interested in getting information about when providing so-called "relationship management" or "relationship banking".

Hardware Environment

Figure 1:
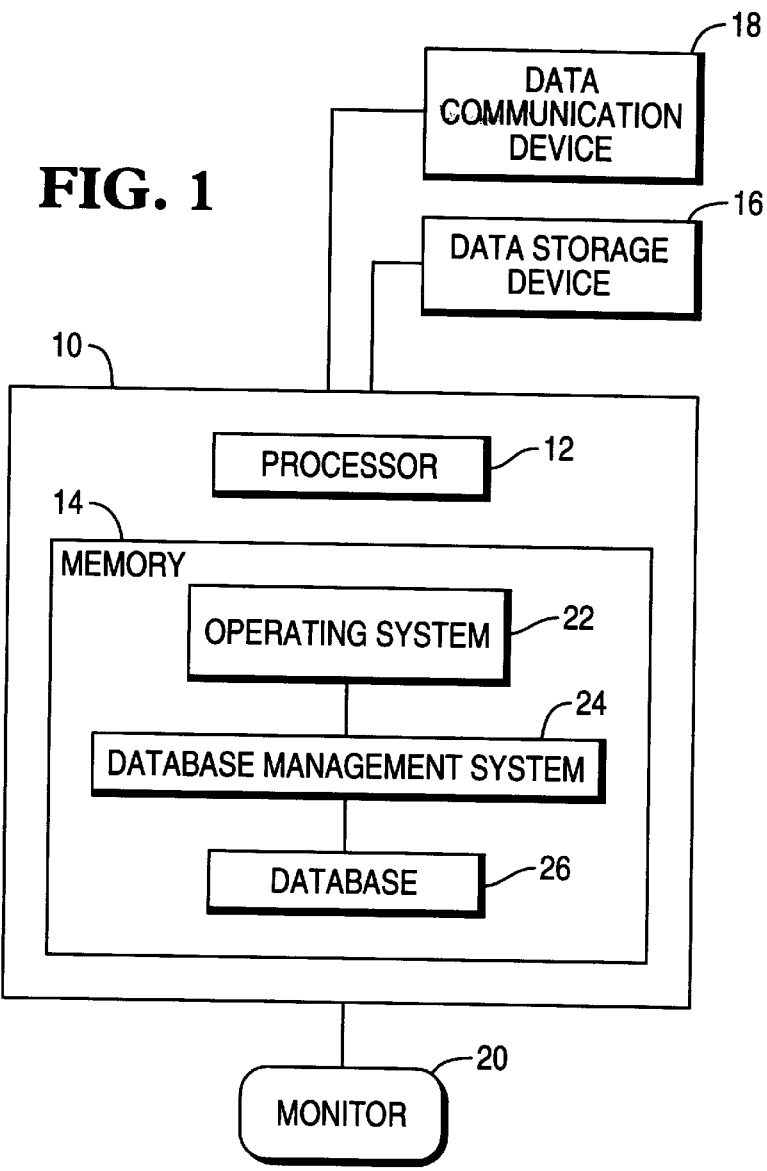
FIG. 1 is a block diagram that illustrates an exemplary hardware environment of the present invention.

FIG. 1 is an exemplary hardware environment used to implement the preferred embodiment of the invention. The present invention is typically implemented using one or more computers 10, each of which is comprised of one or more processors 12, random access memory (RAM) 14, data storage devices 16 (e.g., hard, floppy, and/or CD-ROM disk drives, etc.), data communications devices 18 (e.g., modems, network interfaces, etc.), and monitor 20 (e.g., CRT, ICD display, etc.). It is envisioned that attached to the computers 10 may be other devices, such as read only memory (ROM), a video card, bus interface, keyboard, printers, etc. Often these computers 10 are connected together in large networks, but they also may be standalone systems. Those skilled in the art will recognize that any combination of the above components, or any number of different components, peripherals, and other devices, may be used with the computer 10.

The computer 10 usually operates under the control of an operating system 22. The present invention is usually implemented by one or more computer programs that operate under the control of the operating system 22. However, it should be understood that, in the alternative, the principles of the invention may also apply to specific utilities or functions within the operating system 22 itself. In general, the functions performed in the present invention, whether implemented as part of an operating system 22 or a specific computer program, will be referred to herein as "computer programs".

In the present invention, the computer programs comprises a database management system (DBMS) 24 that implements a computerized financial system. The DBMS 24, in turn, accesses data stored in a database 26. The database 26 describes the operations of a financial institution and comprises one or more tables of data storing one or more of a plurality of data objects, including: (1) party data that identifies any individual or external organization, (2) product data that identifies any marketable product or service offered by the financial institution, (3) account data that identifies an ongoing arrangement between the financial institution and the party data, (4) internal organization data that identifies a unit of the financial institution, (5) contact/ transaction event data that identifies any occurrence of an event that involves the account data or party data, (6) location data that identifies an address for the party data, (7) campaign data that identifies a marketing strategy or promotional event for the financial institution, and (8) channel data that identifies any vehicle by which any individual or external organization interacts with the financial institution. Generally, the database 26 is accessed by the DBMS 24 via relationships between the party data, product data, account data, internal organization data, contact/transaction event data, location data, campaign data, and channel data.

In the preferred embodiment, the operating system 22, DBMS 24, and/or database 26 are embodied in or readable from a computer-readable medium or carrier, e.g., one or more of the fixed and/or removable data storage data devices 16 and/or data communications devices 18 connected to the computer 10. Under control of operating system 22, the DBMS 24 and database 26 may be loaded from the data storage devices 16 or data communications devices 18 into the memory 14 of computer 10. The DBMS 24 comprises instructions which, when read and executed by computer 10, cause the computer 10 to perform the steps necessary to execute the steps or elements of the present invention, including accessing the database 26.

Those skilled in the art will recognize that the exemplary environment illustrated in FIG. 1 is not intended to limit the present invention. Indeed, those skilled in the art will recognize that other alternative hardware environments may be used without departing from the scope of the present invention. For example, the DBMS 26 and database 28 may reside on the same or different computers 10. In another example, the database 28 itself may reside on a single computer 10 or on multiple computers 10.

Entity-Relationship Structure

Using the DBMS 24 in a manner defined by the present invention, the database 26 is organized according to a logical data model that provides for relationship management for financial institutions. In this regard, the database 26 is organized according to an "entity-relationship" structure, wherein an entity defines a subject area of data that is relevant to relationship management for financial institutions and relationships between entities define the functions performed on that data.

Figure 2:
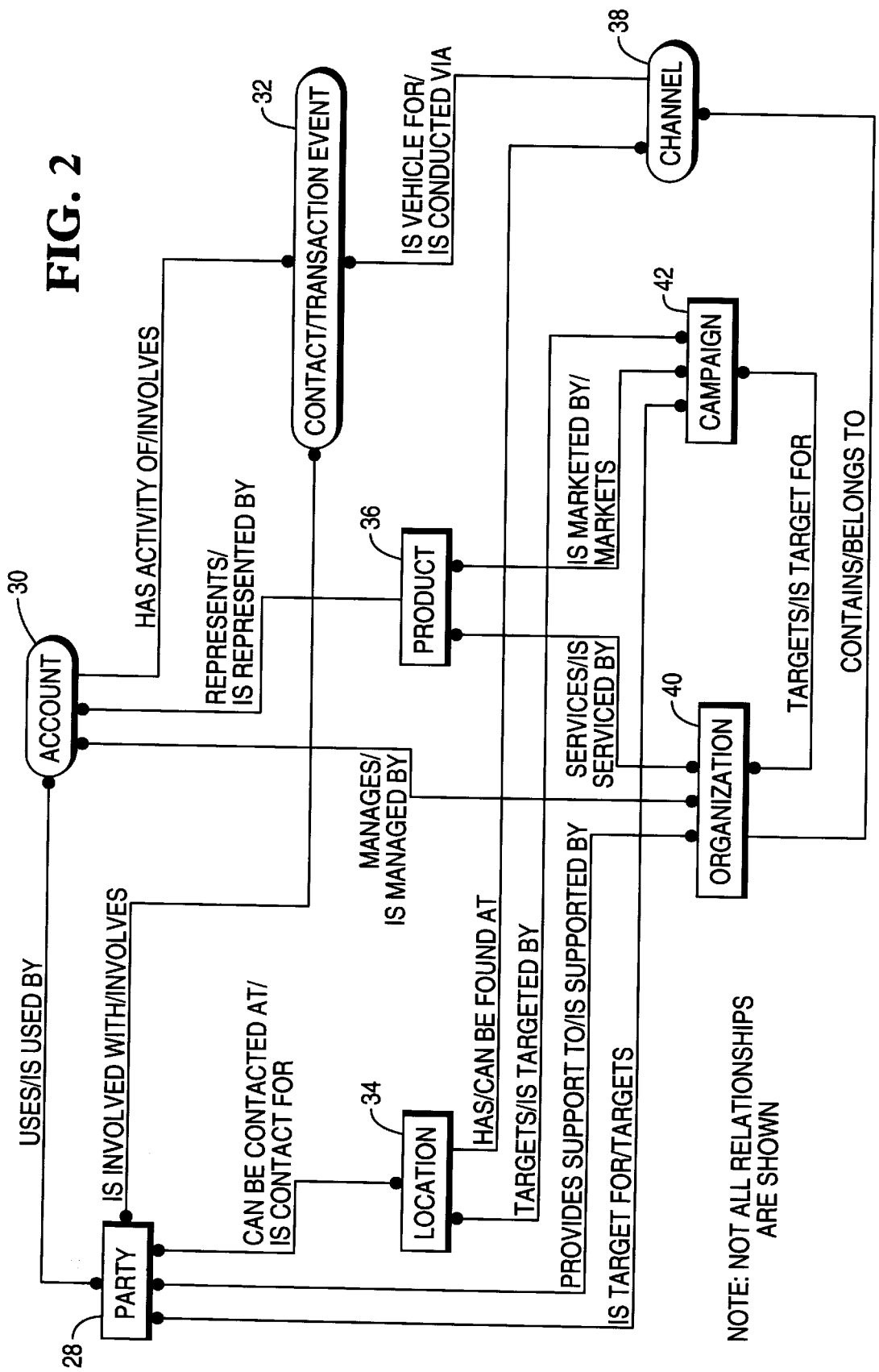
FIG. 2 is a block diagram that illustrates the entity-relationship structure of the database of the present invention.

FIG. 2 is a block diagram that illustrates the entity-relationship structure of the database 26 of the present invention. The entity-relationship structure of the database 26 is organized by the DBMS 24, wherein the boxes represent the subject areas, the lines between boxes represent relationships between subject areas, and the solid circles represent a target of a 'many' relationship. For example, the relationship between Party 28 and Account 30 is many-to-many. An Account 30 can be related to one or many Parties 28 and a Party 28 can have zero, one or many Accounts 30. A one-to-many relationship example is the relationship between Account 30 and Contact/Transaction Event 32. An Account 30 has zero, one or many Events 32, and an Event 32 is related to zero or one Account 30.

Database Entities

The following paragraphs provide a description of the individual subject areas, as defined within the database 26.

Party

The Party 28 subject area consists of any individual or external organization formed for a purpose that is of interest to the financial institution.

The Party 28 may be a customer, a prospect, a competitor, an employee of the financial institution, a business like a mortgage broker, clearinghouse, merchant, or an association like a golf club or college graduating class.

Product

A Product 36 subject area is any marketable product or service offered by the financial institution that can be sold or used by a customer. Examples include certificate of deposits, checking accounts, loans, safe deposit boxes, money orders and notary service. It could include a combination of products to form a package such as the Super Summer Sale package consisting of a certificate of deposit and checking account.

Product 36 subject areas are described by features which are those terms and conditions that describe a product. Features include balance, fee, term and interest rate requirements.

Account

An Account 30 subject area is an ongoing arrangement between the financial institution and a Party 28 for the provision of a product or service. Examples include checking account, savings account, time deposit account, and mortgage loan. It is associated with a Party 28 and with a Product 36.

Internal Organization

An Internal Organization 40 subject area is a unit of a financial institution that the financial institution is interested in tracking. Examples include branches, call centers, sales districts, regions, groups, and functions.

Contact/Transaction Event

A Contact/Transaction Event 32 subject area is any occurrence of an event (including transactions) that involve a Party 28 or the Party's 28 account and is of financial or non-financial nature. Examples include deposit, withdrawal, payment, credit card charge, balance inquiry, complaint, product inquiry, interest charge, fee assessment.

Location

A Location 34 subject area is a physical address, electronic address or geographical area. The physical address may be a street, parcel or post office box. The electronic addresses may be an Internet address. A geographical area is any bounded area on the earth such as city, state, province, census block, and postal area.

Campaign

A Campaign 42 subject area is any strategy, plan or promotional event for the purpose of acquiring, retaining or consolidating usage by customers. Examples include a target marketing campaign aimed at college students to open checking accounts and a mass television advertising campaign.

Channel

A Channel 38 subject area is any vehicle by which the customer interacts with the financial institution or receives information about the financial institution for sales or services purposes. Examples of Channels 38 include telephone, on-line banking, mail, over the counter (face to face), voice response unit, automatic teller machine (ATM), point of sale, radio, television and print.

Database Relationships

The following paragraphs provide a description of the relationship of the individual subject areas to each other, as defined within the database 26.

Party-Product Relationships

A Party 28 that is a Customer has a propensity to buy or leave a Product 36.

A Party 28 that is an External Organization may offer Products 36 of the financial institution to potential Customers. An example is an automobile dealer that offers auto loans for a financial institution.

A Party 28 that is an Employee represents many Products 36 and a Product 36 is represented by many Employees.

Party-Account Relationships

A Party 28 that is a Customer can have many Accounts 30 and an Account 30 can be related to one or more Customers as in the case of joint accounts. A Party 28 may be related to an Account 30 not as a Customer but in another role such as beneficiary, co-signor, or reference.

A Party 28 that is a Business may issue credit cards and a Party 28 that is a Business receives funds on a regular basis (standing orders) from zero, one or many Accounts 30.

A Party 28 that is an employee has a relationship with many Accounts 30.

Party-Internal Organization Relationships

A Party 28 that is an Individual may also be an Employee of a Financial Institution. An Internal Organization 40 is a unit of a Financial Institution.

A Party 28 that is a Business may house a financial institution's Internal Organization 40. The business may be different from the financial institution. An example would be where an airport or hospital houses a branch.

An Internal Organization 40 may have many roles with a Customer such as preferred servicing branch for transaction activity or preferred organization for loan questions.

Party-Contact/Transaction Event Relationships

A Party 28 that is an Individual is involved in zero, one or many Contact 32 sessions with the financial institution. A Contact 32 session involves one or more Individuals.

A Party 28 that is a Business may be the merchant for zero, one or many financial account transaction Events 32 with the financial institution (in the case of credit or debit card transactions).

An Event 32 that involves a contact with a customer involves a Party that is an employee, and that employee was the primary contact during that encounter.

Party-Location Relationships

A Party 28 may have zero, one or many phone numbers. A physical address over time is occupied by one or more Parties. A customer physical asset has one physical address at any one point in time. An electronic address may be used by one or more Parties. A Party may have zero, one or many physical and electronic Addresses.

Party-Campaign Relationships

A Party 28 that is a Customer/Prospect is assigned to zero, one or many market Segments of a Campaign 42. A Campaign may target zero, one or many Market Groups.

Party-Channel Relationships

A Party 28 that is a Business houses zero, one or many Channels 38 that are ATM devices. An ATM device is housed by one Business. The Business may not be the financial institution but may be another type of Party such as a supermarket that houses an ATM.

A Party 28 that is a Business houses zero, one or many Channels 38 that are kiosks. A kiosk device is housed by one business. The business may not be the financial institution but another Party 28 such as a supermarket that houses a kiosk.

A Party 28 that is a Business manufactures zero, one or many ATM devices. An ATM device is manufactured by one manufacturer. An ATM device is owned by one Party that is a financial institution.

A Party 28 that is a business houses zero, one or many Channels 38 that are point of sale terminals. A point of sale terminal is housed by one business.

A Party 28 that is a Customer has zero, one or many sales Channel 38 types that are preferred for solicitation purposes.

Product-Account Relationships

An Account 30 at any one time is related to only one Product 36. Over time an Account 30 is related to one or more Products 36. An example of an Account 30 that over time can be related to many Products 36 is when a Certificate of Deposit is renewed under new terms and conditions with a different product ID.

An Account 30 is described by many features that are beyond or replace standard features associated with the Product 36. An example is a fee that is waived for a long time customer.

Product-Internal Organization Relationships

A Product 36 and group of products have many roles with the financial institution's Internal Organization 40 such as is sold by, is developed by, is serviced by.

Product-Contact/Transaction Event Relationships

A Contact 32 with a customer involves zero, one or many Products 36.

Product-Location Relationships

No direct relationship.

Product-Campaign Relationships

A Product 36 is marketed via zero, one or many Campaigns 42. A Campaign 42 markets zero, one or many Products 36. A feature may be a selling point in zero, one or many Campaigns 42, and a Campaign 42 may have zero or many features that are selling points. For example, a feature that is a selling point may be the interest rate or the waiver of an annual fee for the first year. A marketing segment associated with a Campaign 42 is created by one Employee.

Product-Channel Relationships

No direct relationship.

Account-Internal Organization Relationships

An Account 30 is related to the financial institution's Internal Organization 40 for many reasons such as the Internal Organization 40 that originated the account and the Internal Organization 40 that services the account.

Account-Transaction/Contact Event Relationships

A Financial Account event involves one Account 30.

A Non-financial Account event involves one Account 30. An intra-bank and inter-bank financial event involves another customer's Account number (contra-party account).

A Financial Account Event may involve a Card which is related to one or more Accounts. Examples are credit card transactions or ATM withdrawals.

A Financial Non-Account Event may involve a Card. For example, if a non-customer uses the financial institution's ATM to access the network to get to their financial institution. We have a record of the card but there is no account number.

A Non-Financial Account Event may involve a Card. An example would be a balance inquiry with an ATM card for your customer.

Account-Location Relationships

An Account 30 statement is sent to one address.

Account-Campaign Relationships

An Account 30 was created as a result of zero or one campaign.

Account-Channel Relationships

No direct relationship.

Internal Organization-Contact/Transaction Event Relationships

An Event 32 that involves a contact with a customer involves one Internal Organization 40 of the financial institution such as a branch or call center.

Internal Organization-Location Relationships

An Internal Organization 40 can have many physical addresses such as the Location 34 address and post office box. An Internal Organization's 40 span of control may cover many geographical areas.

An Internal Organization 40 may have many electronic addresses. An Internal Organization 40 can be accessed by many phone numbers.

Internal Organization-Campaign Relationships

A Campaign 42 promotional event targets zero, one or many financial institution Internal Organizations 40 such as sales district, region or branch.

Internal Organization-Channel Relationships

Channels 38 may be related to many of the financial institution's Internal Organization for different reasons. For example, an ATM channel is housed by one financial institution organization and managed by another.

Contact/Transaction Event-Location Relationships

No direct relationship.

Contact/Transaction Event-Campaign Relationships

An Event 32 involving a contact with a customer is the result of zero or one Campaign 42.

Contact/Transaction Event-Channel Relationships

A Contact 32 session with a customer involves one Channel 38.

Location-Campaign Relationships

A Campaign 42 targets zero, one or many geographical area Locations 34.

Location-Channel Relationships

A Voice Response Channel 38 and a telephone channel have one telephone number. A Mail Channel 38 may have zero or one electronic mail address associated with it.

Campaign-Channel Relationships

A Campaign 42 at all levels may use many channel types. For example, a plan may use radio, television, and mail channel types. A Campaign 42 at any level can target many specific channel instances, such as the ATM on the corner.

Logical Data Model

Using the expanded subject area definitions, the computer-implemented financial system of the present invention essentially provides a Party-Account-Event (P-A-E) logical data model. In the P-A-E model, Customer has been expanded to Party and Transaction has been expanded to Event. Parties 28 are related to Accounts 30, Accounts 30 are related to Events 32, and Parties 28 are related to Events 32 (for non-account related events).

This simplistic model implies that all other subject areas are directly or indirectly related to the Party 28, Account 30, and Event 32 subject areas. The C-A-T or the P-A-E models can be used as a starting point for institutions who want to start small and later grow into a full model for relationship management. The full model can serve as a road map, and the C-A-T or P-A-E models support the full model as a step in that direction.

The benefit of the DBMS 24 and database 26 that comprise the computer-implemented financial system of the present invention is the ability to describe things in terms abstract enough to encompass a wide range of circumstances. The power of the present invention is that it allows for future flexibility without changing the basic structure of the logical model. The more generic the model, then the more flexible it will be; the more specific the model, then the more limiting and subject to change. For example, Branch and Department are specific organizations. However, they can be abstracted into something else called an 'Internal Organization' 40.

When using the computer-implemented financial system of the present invention, the operator must decide whether to use a generic or specific approach. This decision is based on a particular client's problems. A client may have a particular problem to address quickly and in terms that they understand. They may feel more comfortable with the specific approach. Otherwise, if a client seeks to explore several business questions, the generic approach is appropriate.

Database Management System

Figure 3:
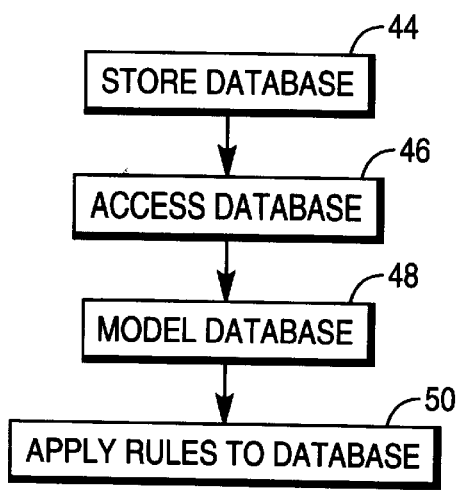
FIG. 3 is a block diagram that illustrates the logic performed by the database management system of the present invention.

FIG. 3 is a block diagram that illustrates the logic performed by the DBMS 24 of the present invention. This logic illustrates the basic functions performed by the DBMS 24 in accessing the database 26, according the logical data model described above. Block 44 represents the computer 10 storing a database 26 describing operations of a financial institution, wherein the database 26 comprises: (1) party data that identifies any individual or external organization, (2) product data that identifies any marketable product or service offered by the financial institution, (3) account data that identifies an ongoing arrangement between the financial institution and the party data, (4) internal organization data that identifies a unit of the financial institution, (5) contact/transaction event data that identifies any occurrence of an event that involves the account data or party data, (6) location data that identifies an address for the party data, (7) campaign data that identifies a marketing strategy or promotional event for the financial institution, and (8) channel data that identifies any vehicle by which any individual or external organization interacts with the financial institution. Block 46 represents the computer 10 accessing the database 26, using the DBMS 26, via relationships between the party data, product data, account data, internal organization data, contact/transaction event data, location data, campaign data, and channel data. Block 48 represents the computer 10 modeling the database 26, using the DBMS 26, by graphically displaying relationships that exist between the data stored in the database 26 on a monitor 20. Block 50 represents the computer 10 applying one or more of a plurality of rules to the data stored in the database 26, using the DBMS 26, wherein rules define relationships between the data stored in the database 26.

Conclusion

This concludes the description of the preferred embodiment of the invention. In summary, the present invention discloses an apparatus, method, and article of manufacture for implementing a financial system. The financial system comprises a computer for storing a database describing operations of a financial institution. The database comprises: (1) party data that identifies any individual or external

What is claimed:

1. A computer-implemented financial system, comprising:
 (a) a computer for storing a database describing operations of a financial institution, wherein the database comprises:
  (1) party data that identifies any individual or external organization,
  (2) product data that identifies any marketable product or service offered by the financial institution,
  (3) account data that identifies an ongoing arrangement between the financial institution and the party data,
  (4) internal organization data that identifies a unit of the financial institution,
  (5) contact/transaction event data that identifies any occurrence of an event that involves the account data or party data, (6) location data that identifies an address for the party data, (7) campaign data that identifies a marketing strategy or promotional event for the financial institution, and (8) channel data that identifies any vehicle by which any individual or external organization interacts with the financial institution; and (b) database management system means, performed by the computer, for accessing the stored database via relationships between various elements of the party data, product data, account data, internal organization data, contact/transaction event data, location data, campaign data, and channel data.

2. The computer-implemented financial system of claim 1 above, wherein the database management system means further comprises means for modeling the database by graphically displaying the relationships that exist between the data stored in the database on a monitor connected to the computer.

3. The computer-implemented financial system of claim 2 above, wherein the database management system means further comprises means for applying a plurality of rules to the data stored in the database.

4. The computer-implemented banking system of claim 3 above, wherein rules define the relationships between the data stored in the database.

5. The computer-implemented financial system of claim 1 above, wherein the relationships comprise one or more relationships selected from a group comprising a party-product data relationship, a party-account data relationship, a party-internal organization data relationship, a party-contact/transaction event data relationship, a party-location data relationship, a party-campaign data relationship, a party-channel data relationship, a product-account data relationship, a product-internal organization data relationship, a product-contact/transaction event data relationship, a product-location data relationship, a product-campaign data relationship, a product-channel data relationship, an account-internal organization data relationship, an account-transaction/contact event data relationship, an account-location data relationship, an account-campaign data relationship, an internal organization-contact/transaction event data relationship, an internal organization-location data relationship, an internal organization-campaign data relationship, an internal organization-channel data relationship, a contact/transaction event-location data relationship, a contact/transaction event-campaign data relationship, a contact/transaction event-channel data relationship, a location-campaign data relationship, a location-channel data relationship, and a campaign-channel data relationship.

6. A method of storing and accessing financial data in a computer-implemented financial system, comprising the steps of:

(a) storing a database describing operations of a financial institution in a computer, wherein the database comprises:

(1) party data that identifies any individual or external organization, (2) product data that identifies any marketable product or service offered by the financial institution, (3) account data that identifies an ongoing arrangement between the financial institution and the party data, (4) internal organization data that identifies a unit of the financial institution, (5) contact/transaction event data that identifies any occurrence of an event that involves the account data or party data, (6) location data that identifies an address for the party data, (7) campaign data that identifies a marketing strategy or promotional event for the financial institution, and (8) channel data that identifies any vehicle by which any individual or external organization interacts with the financial institution; and (b) accessing the database stored in the computer, using a database management system performed by the computer, via relationships between various elements of the party data, product data, account data, internal organization data, contact/transaction event data, location data, campaign data, and channel data.

7. The method of claim 6 above, further comprising the step of modeling the database by graphically displaying the relationships that exist between the data stored in the database on a monitor connected to the computer.

8. The method of claim 6 above, further comprising the step of applying a plurality of rules to the data stored in the database.

9. The method of claim 8 above, wherein rules define the relationships between the data stored in the database.

10. The method of claim 6 above, wherein the relationships comprise one or more relationships selected from a group comprising a party-product data relationship, a party-account data relationship, a party-internal organization data relationship, a party-contact/transaction event data relationship, a party-location data relationship, a party-campaign data relationship, a party-channel data relationship, a product-account data relationship, a product-internal organization data relationship, a product-contact/transaction event data relationship, a product-location data relationship, a product-campaign data relationship, a product-channel data relationship, an account-internal organization data relationship, an account-transaction/contact event data relationship, an account-location data relationship, an account-campaign data relationship, an internal organization-contact/transaction event data relationship, an internal organization-location data relationship, an internal organization-campaign data relationship, an internal organization-channel data relationship, a contact/transaction event-location data relationship, a contact/transaction event-campaign data relationship, a contact/transaction event-channel data relationship, a location-campaign data relationship, a location-channel data relationship, and a campaign-channel data relationship.

11. An article of manufacture comprising a computer program carrier readable by a computer and embodying one or more instructions executable by the computer to perform method steps of storing and accessing financial data in a computer-implemented financial system, the method comprising the steps of:

(a) storing a database describing operations of a financial institution in a computer, wherein the database comprises:

(1) party data that identifies any individual or external organization, (2) product data that identifies any marketable product or service offered by the financial institution, (3) account data that identifies an ongoing arrangement between the financial institution and the party data, (4) internal organization data that identifies a unit of the financial institution, (5) contact/transaction event data that identifies any occurrence of an event that involves the account data or party data, (6) location data that identifies an address for the party data,
(7) campaign data that identifies a marketing strategy or promotional event for the financial institution, and
(8) channel data that identifies any vehicle by which any individual or external organization interacts with the financial institution; and (b) accessing the database stored in the computer, using a database management system performed by the computer, via relationships between various elements of the party data, product data, account data, internal organization data, contact/transaction event data, location data, campaign data, and channel data.

12. The method of claim 11 above, further comprising the step of modeling the database by graphically displaying the relationships that exist between the data stored in the database on a monitor connected to the computer.

13. The method of claim 11 above, further comprising the step of applying a plurality of rules to the data stored in the database.

14. The method of claim 13 above, wherein rules define the relationships between the data stored in the database.

15. The method of claim 11 above, wherein the relationships comprise one or more relationships selected from a group comprising a party-product data relationship, a party-account data relationship, a party-internal organization data relationship, a party-contact/transaction event data relationship, a party-location data relationship, a party-campaign data relationship, a party-channel data relationship, a product-account data relationship, a product-internal organization data relationship, a product-contact/transaction event data relationship, a product-location data relationship, a product-campaign data relationship, a product-channel data relationship, an account-internal organization data relationship, an account-transaction/contact event data relationship, an account-location data relationship, an account-campaign data relationship, an internal organization-contact/transaction event data relationship, an internal organization-location data relationship, an internal organization-campaign data relationship, an internal organization-channel data relationship, a contact/transaction event-location data relationship, a contact/transaction event-campaign data relationship, a contact/transaction event-channel data relationship, a location-campaign data relationship, a location-channel data relationship, and a campaign-channel data relationship.

16. A memory for storing a database describing operations of a financial institution for access by a database management system executed by a computer, the memory comprising:

(a) a database comprising one or more tables of data storing one or more of a plurality of data objects, including:

(1) party data that identifies any individual or external organization,
(2) product data that identifies any marketable product or service offered by the financial institution,
(3) account data that identifies an ongoing arrangement between the financial institution and the party data,
(4) internal organization data that identifies a unit of the financial institution,
(5) contact/transaction event data that identifies any occurrence of an event that involves the account data or party data,
(6) location data that identifies an address for the party data,
(7) campaign data that identifies a marketing strategy or promotional event for the financial institution, and
(8) channel data that identifies any vehicle by which any individual or external organization interacts with the financial institution; and (b) the database being accessed by a database management system performed by the computer via the relationships between the party data, product data, account data, internal organization data, contact/transaction event data, location data, campaign data, and channel data.

17. The memory of claim 16 above, wherein the relationships comprise one or more relationships selected from a group comprising a party-product data relationship, a party-account data relationship, a party-internal organization data relationship, a party-contact/transaction event data relationship, a party-location data relationship, a party-campaign data relationship, a party-channel data relationship, a product-account data relationship, a product-internal organization data relationship, a product-contact/transaction event data relationship, a product-location data relationship, a product-campaign data relationship, a product-channel data relationship, an account-internal organization data relationship, an account-transaction/contact event data relationship, an account-location data relationship, an account-campaign data relationship, an internal organization-contact/transaction event data relationship, an internal organization-location data relationship, an internal organization-campaign data relationship, an internal organization-channel data relationship, a contact/transaction event-location data relationship, a contact/transaction event-campaign data relationship, a contact/transaction event-channel data relationship, a location-campaign data relationship, a location-channel data relationship, and a campaign-channel data relationship.

* * * * *